UNITED STATES PATENT OFFICE.

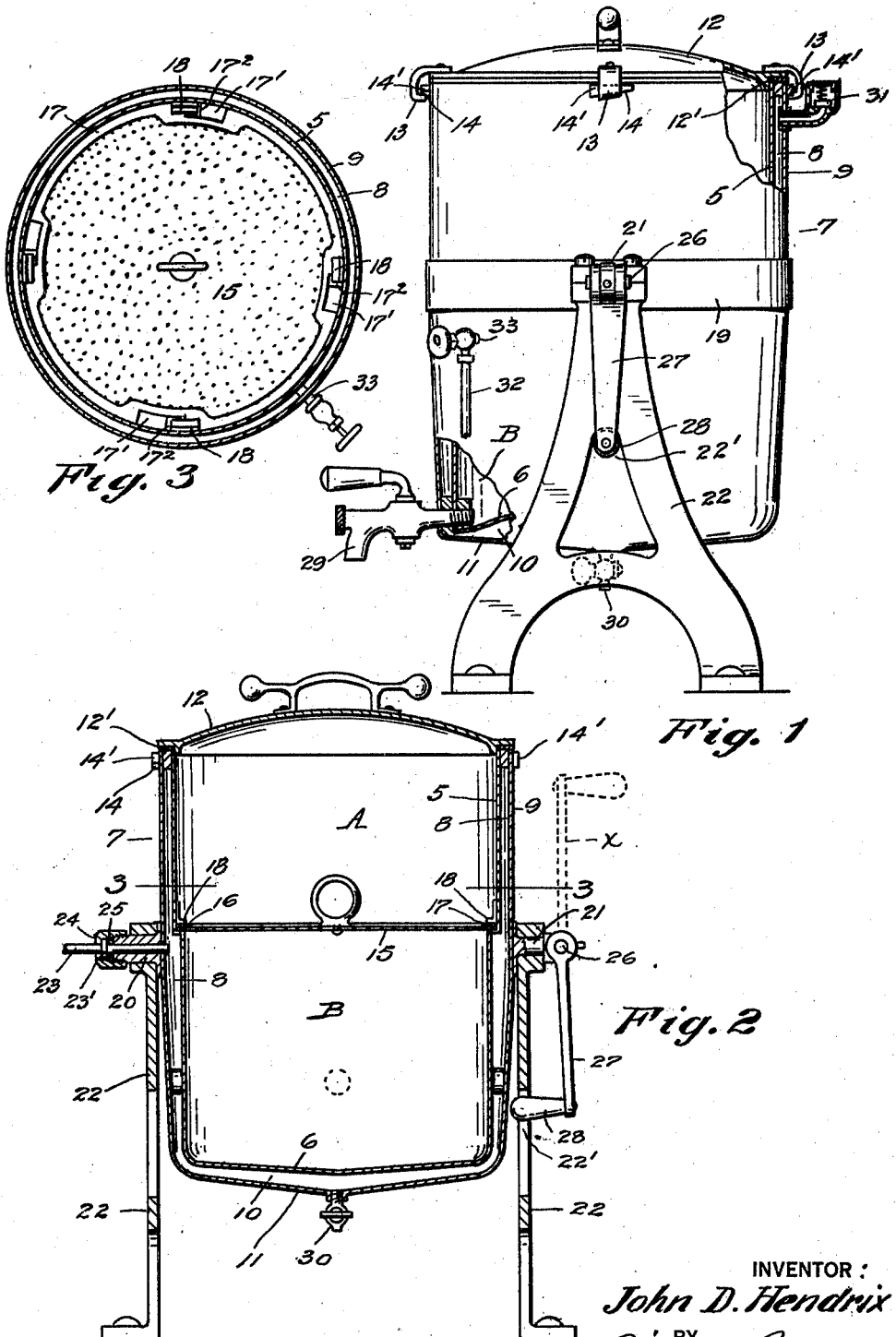
J. D. HENDRIX.
REVERSIBLE COFFEE URN.
APPLICATION FILED SEPT. 30, 1918.
1,315,198. Patented Sept. 2, 1919.
INVENTOR:
John D. Hendrix
BY
Pierre Barnes
ATTORNEY

JOHN D. HENDRIX, OF BREMERTON, WASHINGTON.

REVERSIBLE COFFEE-URN.

1,315,198.   Specification of Letters Patent.   Patented Sept. 2, 1919.

Application filed September 30, 1918. Serial No. 256,327.

*To all whom it may concern:*

Be it known that I, JOHN D. HENDRIX, a citizen of the United States, residing at Bremerton, in the county of Kitsap and State of Washington, have invented certain new and useful Improvements in Reversible Coffee-Urns, of which the following is a specification.

This invention relates to urns in which an infusion of coffee is made. The object of my invention is to provide apparatus of this character wherein a superior quality of coffee beverage may be quickly and conveniently made with an economical consumption of the ground coffee berry.

The invention consists in the novel construction, adaptation and combination of devices, as will be hereinafter described and claimed and illustrated in the accompanying drawings, in which—

Figure 1 is a side elevational view shown partly in section, of apparatus embodying my invention. Fig. 2 is a transverse vertical sectional view of the same. Fig. 3 is a horizontal section through 3—3 of Fig. 2.

In said drawings, the reference numeral 5 designates the peripheral wall and 6 the bottom wall of a substantially cylindrical vessel which is open at the top. Inclosing said vessel is a casing 7 of sufficient size to afford a heating space 8 between its peripheral wall 9 and the corresponding wall 5 of said vessel, and a space 10 between the bottom 6 of the latter and the bottom wall 11 of the casing.

12 represents a cover having a circumferential flange adapted to seat upon a gasket $12^1$ provided on the rim of the vessel to furnish a liquid- and steam-tight joint thereat when the cover is secured in place. The preferred means for securing the cover is by the provision of hook shaped fingers 13 protruding from the cover engaging the sloping under faces 14 of lugs $14^1$ provided on the casing wall 9 when the cover is turned in one rotary direction and is released when oppositely turned.

15 represents a foraminated plate serving as a partition to divide the chamber within said vessel into upper and lower compartments A and B; to which end the vessel is formed or provided at a short distance above the mid-height thereof with a peripheral shoulder 16 upon which said plate is supported by an annular locking member 17 (Fig. 3) engageable between the plate and bracket elements 18 protruding from the vessel wall 5. To enable said bracket elements to be engaged or disengaged by the locking member 17, the latter is formed with circumferentially spaced notches $17^1$ to accommodate the bracket elements when inserting said member and by subsequently turning the member about its axis sloping parts $17^2$ of the member will act against the undersides of the respective bracket elements to force the locking ring downwardly to retain said plate firmly against the shoulder 16.

19 represents a band rigidly secured to the casing wall 9 at or about the mid-length of the same, said band being formed at diametrically opposite sides with trunnions 20 and 21 which are journaled in bearings provided in standards 22 which serve as a supporting frame for the urn proper comprising the aforedescribed parts.

The trunnion 20 is axially bored for the reception of a tube 23 which extends into space 8 for the admission thereinto of steam from a suitable source of supply, not shown. The tube 23, as shown in Fig. 2, is provided with a collar $23^1$ which is engaged by a gland nut 24 screwed upon threads provided on the trunnion 20 to prevent the accidental withdrawal of the tube and also serving to press said collar against a packing 25 for the purpose of making a non-leakable joint about said tube.

The outer end of the other trunnion 21 is pivotally connected by means of a pin 26 to arm 27 of a crank having a handle arm 28. Said crank is arranged so as to be turned down, as represented by full lines in Fig. 2, and have the handle arm 28 engage in a slot $22^1$ of the adjacent standard when the urn is in upright position, to be accordingly locked against being turned about an axis extending through said trunnions.

For rotating the urn, the crank is brought into its dotted line position $x$ (Fig. 2) so that the operator may grasp the handle.

29 represents a draw-off faucet extending into the bottom of vessel compartment B. A valve 30 is provided in the bottom wall 11 of the casing for draining condensations of steam from the space about the vessel.

31 is a valve connected to said space adjacent to the top for relieving the vessel and casing from the effects of a relatively high steam pressure.

32 represents a gage glass connected from its upper and lower ends by fittings, such as 33, with the vessel compartment B for determining the quantity of liquid coffee therein.

In the use of my apparatus the urn is maintained at a suitably hot temperature by steam supplied through tube 23 into the space 8. With the urn in the upright position in which it is illustrated in Figs. 1 and 2, and with the cover 12 removed, a quantity of ground coffee is deposited on partition 15 and an appropriate quantity of water is poured into the vessel. The cover is then replaced and secured by hooked fingers 13 engaging the lugs $14^1$ as above described.

The operator disengages the crank handle 28 from the standard 22 and then by means of the crank imparts a rotary movement to the urn to present the same in an inverted position, whereat it is held until the liquid has passed through the partition 15 into the compartment A which is now below the compartment B; after which the urn is rotatably moved into its normal upright position until the liquid filtrates through the coffee grounds and partition back into the compartment B, thus completing one cycle of operation, and which may be repeated one or more times according to the relative quantities of the ground coffee and liquid contained in the vessel and also to the quality or character of coffee which is desired.

The referred to turnings of the urn, it is to be understood, are to be done intermittently, a satisfactory product being attained by allowing the urn to remain for longer or shorter periods in its upright position to subject the grounds to the softening action of vapor arising from the subjacent liquid between the times when the grounds are immersed in the liquid when the urn is inverted.

The construction and operation of my invention will, it is thought, be understood from the foregoing description.

What I claim, is—

1. In apparatus of the character described, an invertible coffee urn comprising a vessel open at the top, a cover for closing said opening, a foraminous partition dividing the chamber within the vessel into an upper and a lower compartment, a casing surrounding said vessel and affording space therebetween, a draw-off faucet communicating with the bottom of said lower compartment, and trunnions provided at diametrically opposite sides of the urn, in combination with a support provided with journal bearings for said trunnions, and means extending axially through one of said trunnions for the admission of a heating medium into the space inclosed by said casing.

2. In apparatus of the character described, an invertible coffee urn comprising a vessel open at the top, a cover for closing said opening, a foraminous partition dividing the chamber within the vessel into an upper and a lower compartment, a casing surrounding said vessel and affording space therebetween, a draw-off faucet communicating with the bottom of said lower compartment, and trunnions provided at diametrically opposite sides of the urn, in combination with a support provided with journal bearings for said trunnions, means connected with one of said trunnions for rotatably moving said urn, and means extending axially through the other of said trunnions for the admission of a heating medium into the space inclosed by said casing.

Signed at Seattle, Washington, this 21st day of September, 1918.

JOHN D. HENDRIX.

Witnesses:
E. PETERSON,
PIERRE BARNES.